US008265651B2

(12) United States Patent
Amidi

(10) Patent No.: US 8,265,651 B2
(45) Date of Patent: Sep. 11, 2012

(54) SYSTEM AND APPARATUS FOR INTEGRATED WIRELESS LOCATION DETECTION

(75) Inventor: Soroush Amidi, Montreal (CA)

(73) Assignee: Honeywell International Inc., Morristown, NJ (US)

( * ) Notice: Subject to any disclaimer, the term of this patent is extended or adjusted under 35 U.S.C. 154(b) by 1455 days.

(21) Appl. No.: 11/879,543

(22) Filed: Jul. 17, 2007

(65) Prior Publication Data

US 2009/0021390 A1    Jan. 22, 2009

(51) Int. Cl.
*G08B 5/22* (2006.01)
(52) U.S. Cl. ..................... 455/456.1; 455/418
(58) Field of Classification Search .............. 455/418, 455/456.1, 456.4; 340/572.4, 825.49
See application file for complete search history.

(56) References Cited

U.S. PATENT DOCUMENTS

| | | | |
|---|---|---|---|
| 6,034,603 A | 3/2000 | Steeves | |
| 6,570,487 B1 | 5/2003 | Steeves | |
| 7,005,985 B1 | 2/2006 | Steeves | |
| 7,286,158 B1 | 10/2007 | Griebenow | |
| 7,706,809 B2 * | 4/2010 | Sharony | 455/456.1 |
| 2005/0107953 A1 | 5/2005 | Sugla | |
| 2006/0170565 A1 | 8/2006 | Husak et al. | |
| 2007/0132576 A1 | 6/2007 | Kolavennu et al. | |
| 2007/0132577 A1 | 6/2007 | Kolavennu | |
| 2007/0132637 A1 | 6/2007 | Kolavennu et al. | |
| 2007/0161401 A1 | 7/2007 | Sheynblat | |
| 2007/0205886 A1 | 9/2007 | Huseth et al. | |
| 2007/0241901 A1 | 10/2007 | Cage et al. | |
| 2007/0241965 A1 | 10/2007 | Kolavennu et al. | |
| 2007/0268884 A1 | 11/2007 | Kolavennu et al. | |
| 2007/0290855 A1* | 12/2007 | Nagino et al. | 340/572.1 |
| 2008/0109098 A1 | 5/2008 | Moshier et al. | |
| 2008/0109099 A1 | 5/2008 | Moshier | |
| 2008/0122641 A1 | 5/2008 | Amidi | |
| 2008/0123934 A1 | 5/2008 | Amidi | |

FOREIGN PATENT DOCUMENTS

| | | |
|---|---|---|
| JP | 2005-55186 A | 3/2005 |
| WO | WO2006-092858 A1 | 9/2006 |

OTHER PUBLICATIONS

"IntelaTrac PKS Redefines Field Data Collection and Management," Honeywell, Feb. 2006, 2 pages.
"Powerful Calibration Management with DocuMint," Honeywell, Feb. 2008, 4 pages.
"Lumidor Minimax XT," Honeywell, Dec. 2005, 4 pages.
"PanOS Platform, Unified Location Management Platform," PanGo, 2007, 2 pages.
"Ekahau T301-A Wi-Fi Tag," ekahau, 2007, 2 pages.
"n-sight: The Mobile Video Collaboration System (MVCS)", LibreStream, 2007, 5 pages.
Supplementary European Search Report dated Jun. 21, 2011 in connection with European Patent Application No. EP 08 77 2495.

(Continued)

*Primary Examiner* — Sam Bhattacharya

(57) ABSTRACT

An apparatus, system and method are provided for integrated wireless location detection. The system includes a location detection (LD) transmitter that transmits first and second radio frequency signals in first and second formats, respectively. First and second LD receivers, respectively, receive the first and second signals and determine first and second information relating to a location of the LD transmitter. An LD server wirelessly receives the first and second information and calculates the location of the LD transmitter from one of the first and second information. The LD server may receive a signal indicating a preferred one of the first and second information and calculate the location from the preferred one of the first and second information.

20 Claims, 3 Drawing Sheets

OTHER PUBLICATIONS

Honeywell Process Solutions, "Mobile Station," Honeywell, Jul. 2007, 2 pages.
Honeywell Process Solutions, "IntelaTrac PKS," Honeywell, Mar. 2006, 3 pages.
Communication pursuant to Article 94(3) EPC dated Jun. 29, 2011 in connection with European Patent Application No. EP 08 772 495.1.

* cited by examiner

US 8,265,651 B2

SYSTEM AND APPARATUS FOR INTEGRATED WIRELESS LOCATION DETECTION

TECHNICAL FIELD

This disclosure relates generally to communication systems and more specifically to a system and apparatus for integrated wireless location detection.

BACKGROUND

In many process control applications the cost of running wires from nodes such as sensors, actuators and user interfaces to the process control system limits the number and location of such nodes initially deployed. Cost and difficulty of wiring installation may also limit the deployment of additional nodes in an already-functioning plant. The recent development of wireless communication technologies-such as Bluetooth, IEEE® 802.11, RFID and others-promise a solution to such wiring costs, but not without introducing new challenges to the reliability and security of a process control system.

Processing facilities are often managed using process control systems. Example processing facilities include manufacturing plants, chemical plants, crude oil refineries, ore processing plants, and coal or other types of mines. Among other operations, process control systems typically manage the use of valves, pumps, and other industrial equipment in the processing facilities.

People and asset tracking systems often provide the ability to track the locations of various people and assets in a particular environment. These systems are routinely used as part of security systems, allowing the security systems to identify when people enter restricted areas or when assets are moved from their designated locations. In an industrial facility, such systems are used to improve safety, security and operational efficiency. As a security system, an asset tracking systems can send a notification when an unauthorized individual, wearing a tracking badge, enters a restricted area. As a safety system, an asset tracking system can locate personal when incidents occur or can integrate the location of assets during a dangerous procedure. Furthermore, as an operational improvement system, an asset tracking system can locate an asset or provide statistical data regarding asset utilization. However, continuous precise real-time people and asset tracking systems were typically not feasible for covering large indoor or outdoor areas, such as large industrial or other processing facilities. The development of Ultra Wide Band (UWB) Radio Frequency Identification (RFID) tracking technology and other technology has made it possible to track people and assets in very large facilities.

SUMMARY

This disclosure provides a system and apparatus for integrated wireless location detection.

In a first embodiment, a system includes a location detection (LD) transmitter, first and second LD receivers, and an LD server. The LD transmitter is operable to transmit a first radio frequency (RF) signal in a first format and a second RF signal in a second format. The first LD receiver is operable to receive the first RF signal from the LD transmitter and determine from the first RF signal first information relating to a location of the LD transmitter. The second LD receiver is operable to receive the second RF signal from the LD transmitter and determine from the second RF signal second information relating to the location of the LD transmitter. The LD server is operable to receive the first information and second information wirelessly from the first LD receiver and second LD receiver, respectively, and calculate the location of the LD transmitter from one of the first information and second information.

In particular embodiments, the LD server is further operable to receive a signal indicating a preferred one of the first information and second information and calculate the location of the LD transmitter from the preferred one of the first information and second information.

In still other embodiments, the LD transmitter is further operable to transmit an identifier in at least one of the first RF signal and the second RF signal. The LD server is further operable to receive a signal indicating a preferred one of the first information and second information for the LD transmitter, receive the identifier from at least one of the first LD receiver and second LD receiver, and, in response to the identifier, calculate the location of the LD transmitter from the preferred one of the first information and second information.

In a second embodiment, an apparatus includes a network interface and a location calculator. The location calculator is operable to receive via the network interface first information from a first LD receiver, the first information relating to a location of an LD transmitter and determined from a first RF signal in a first RF format received from the LD transmitter. The location calculator is also operable to receive via the network interface second information from a second LD receiver, the second information relating to the location of the LD transmitter and determined from a second RF signal in a second RF format received from the LD transmitter. The location calculator is further operable to calculate the location of the LD transmitter from one of the first information and second information.

In a third embodiment, a method includes transmitting a first RF signal in a first format from an LD transmitter and transmitting a second RF signal in a second format from the LD transmitter. The method also includes receiving the first RF signal in a first LD receiver and determining from the first RF signal first information relating to a location of the LD transmitter. The method further includes receiving the second RF signal in a second LD receiver and determining from the second RF signal second information relating to the location of the LD transmitter. The method also includes receiving the first information and second information wirelessly in an LD server and calculating the location of the LD transmitter from one of the first information and second information.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
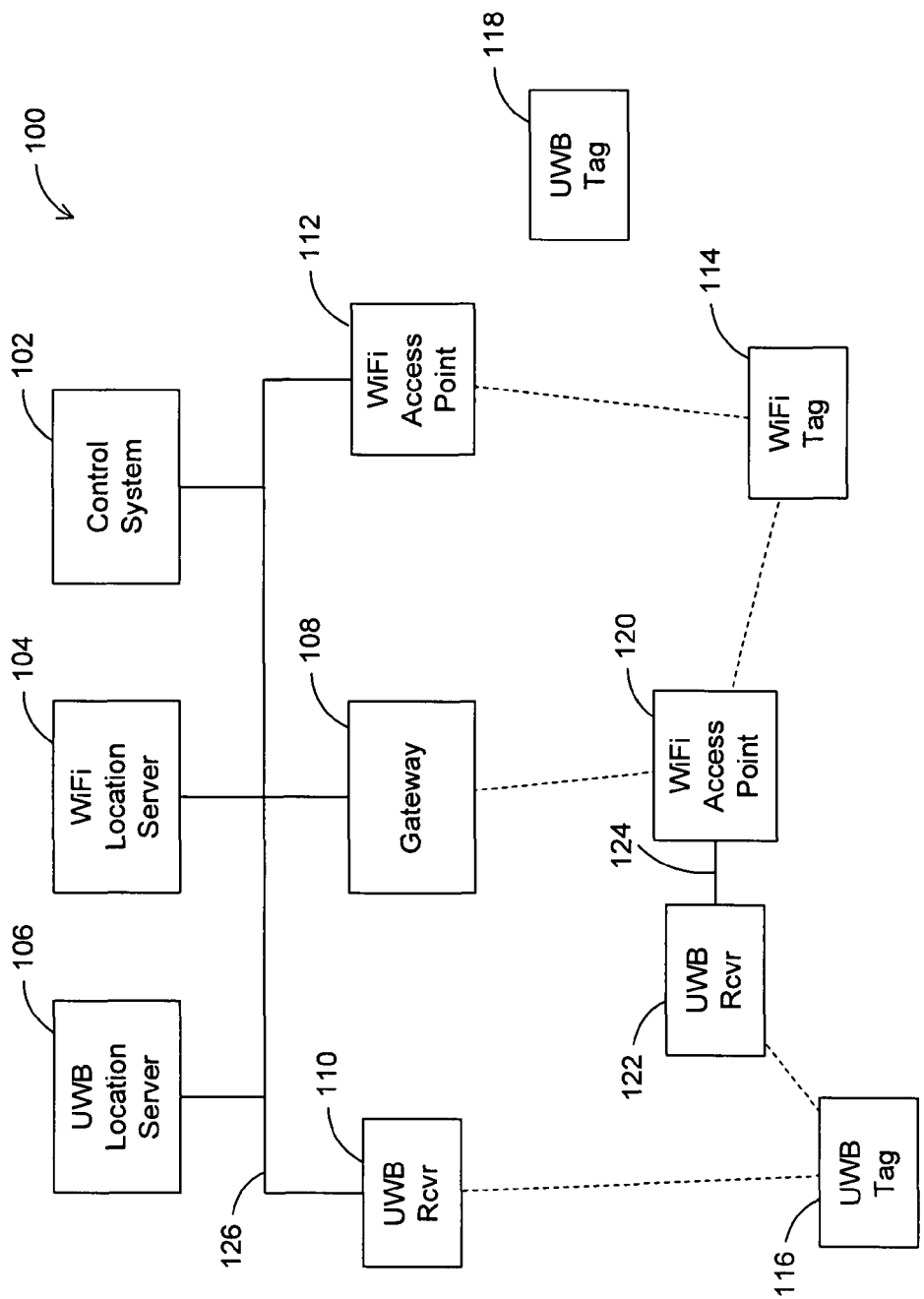
FIG. 1 illustrates a system for providing wireless reporting of location information.

FIG. 1 illustrates a system 100 for providing wireless reporting of location information. A communication network 126 couples control system 102 to a wireless gateway 108 that provides wireless communication to process control system elements.

A WiFi location server 104, coupled to a WiFi access point 112 by the communication network 126, provides location detection functionality in the system 100. The WiFi location server 104 also couples wirelessly to a WiFi access point 120 through the communication network 126 and the gateway 108. Where a WiFi tag 114 is in communication range of the WiFi access point 112, the WiFi access point 112 may receive an RF signal in the WiFi format from the WiFi tag 114 and determine information from the signal relating to a location of the WiFi tag 114. The WiFi access point 112 may then send the information via the communication network 126 to the WiFi location server 104.

Where the WiFi tag 114 is also in communication range of the WiFi access point 120, the WiFi access point 120 may receive an RF signal in the WiFi format from the WiFi tag 114 and determine information from the signal relating to the location of the WiFi tag 114. The WiFi access point 120 may then send the information wirelessly to the gateway 108, which forwards the information via the communication network 126 to the WiFi location server 104. The WiFi location server 104 may then use the location information received from one or both of the WiFi access points 112 and 120 to calculate the location of the WiFi tag 114.

An Ultra Wide Band (UWB) location server 106, coupled to a UWB receiver 110 by the communication network 126, also provides location detection functionality in the system 100. The UWB location server 106 also couples wirelessly to a UWB receiver 122 through the communication network 126, the gateway 108, and the WiFi access point 120. The UWB receiver 122 is coupled to the WiFi access point 120 by a wired communication link 124. Where a UWB tag 116 is in communication range of the UWB receiver 110, the UWB receiver 110 may receive an RF signal in the UWB format from the UWB tag 116 and determine information from the signal relating to a location of the UWB tag 116. The UWB receiver 110 may then send the information via the communication network 126 to the UWB location server 106.

Where the UWB tag 116 is also in communication range of the UWB receiver 122, the UWB receiver 122 may receive an RF signal in the UWB format from the UWB tag 116 and determine information from the signal relating to the location of the UWB tag 116. The UWB receiver 122 may then send the information to the WiFi access point 120, which sends the information wirelessly to the gateway 108, which forwards the information via the communication network 126 to the UWB location server 106. The UWB location server 106 may then use the location information received from one or both of the UWB receivers 110 and 122 to calculate the location of the UWB tag 116.

A UWB tag 118 may be located out of communication range of the UWB receivers 110 and 122, but in communication range of the WiFi access points 112 and 114. In such a situation, the UWB location server 106 will not be able to calculate a location of the tag 118, despite its being in communication range of the system 100. This is because the UWB and WiFi location detection functions of the system 100 operate using separate infrastructures.

WiFi access points may be located throughout a processing facility for process control and other communication purposes. In areas covered by such a WiFi infrastructure, WiFi location detection may be implemented without the installation of additional hardware. UWB location detection systems have a greater level of accuracy and less susceptibility to RF clutter. However, in locations where this greater accuracy is needed, additional infrastructure must be installed to provide UWB location detection. UWB receivers must be installed and wired connections provided-either to the process control network or to nearby WiFi access points. Where a WiFi access point is not already located in the desired UWB coverage area, one must be installed to provide communication back to the UWB location server.

Figure 2:
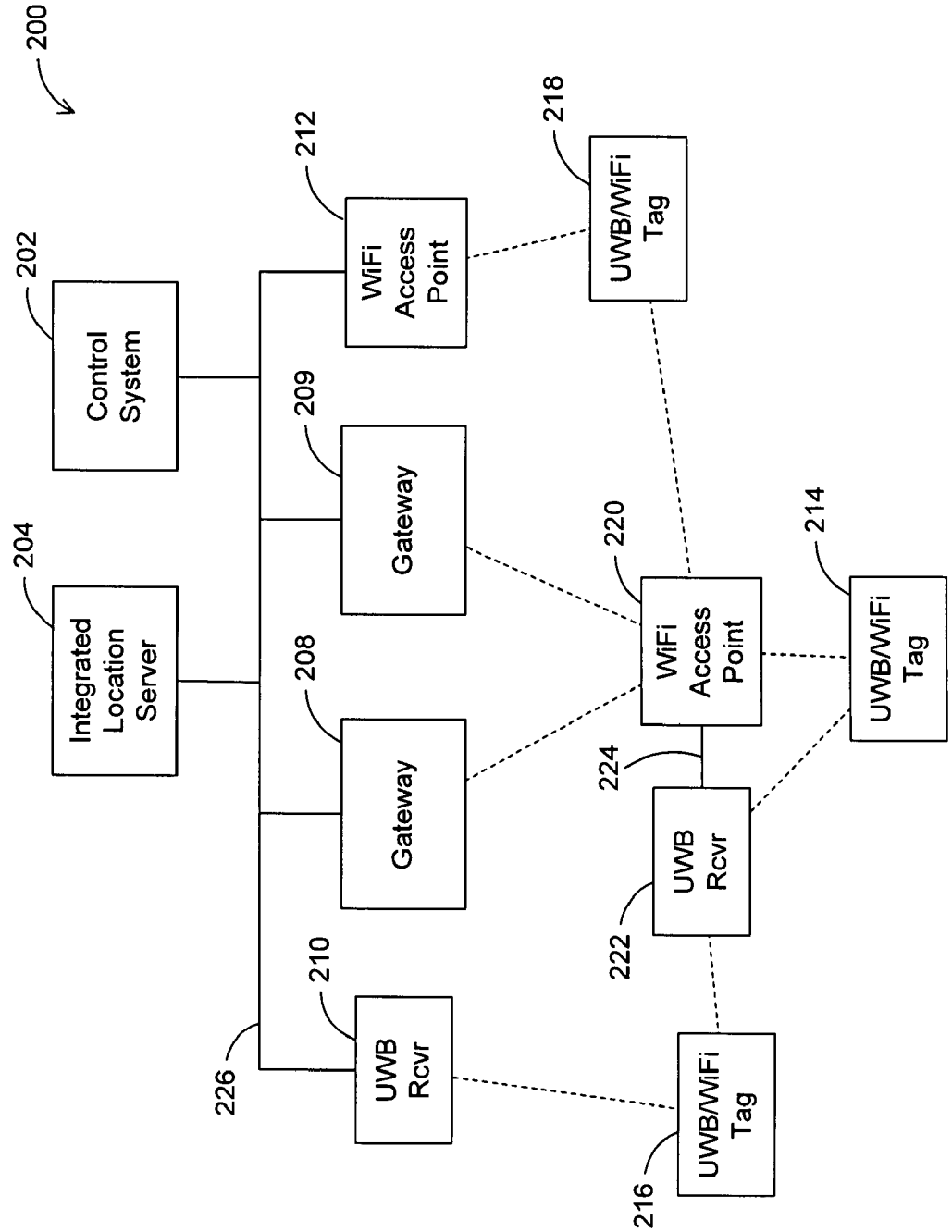
FIG. 2 illustrates a system according to the present disclosure for providing integrated wireless reporting of location information.

FIG. 2 illustrates a system 200 according to the present disclosure for providing integrated wireless reporting of location information. The embodiment of the system 200 shown in FIG. 2 is for illustration only. Other embodiments of the system 200 could be used without departing from the scope of this disclosure.

A control system 202 communicates via a communication network 226 and RF gateways 208 and 209 with process control elements (not shown) of the system 200. The control system 202 also communicates with an integrated location server 204 via the communication network 226. Based upon information received via the communication network 226, the integrated location server 204 is operable to calculate locations of integrated location tags 214, 216 and 218. The tags 214, 216 and 218 include both UWB and WiFi transmitters. In other embodiments of the disclosure, however, integrated location tags may employ other combinations of location detection technologies.

The integrated location tag 216 may be in a location served only by a UWB receiver 210 and a UWB receiver 222. The UWB receiver 210 may receive an RF signal in the UWB format sent by the tag 216. The UWB receiver 210 may then detect information relating to the location of the tag 216 and send that information to the integrated location server 204 via the communication network 226. The UWB receiver 222 may also receive an RF signal in the UWB format sent by the tag 216. The UWB receiver 222 may then detect information relating to the location of the tag 216 and send that information to the integrated location server 204 via a communication link 224 to a WiFi access point 220, which wirelessly sends the information to the integrated location server 204 via the RF gateways 208 and 209 and the communication network 226.

The integrated location tag 218 may be in a location served only by a WiFi access point 212 and the WiFi access point 220. The WiFi access point 212 may receive an RF signal in the WiFi format sent by the tag 218. The WiFi access point 212 may then detect information relating to the location of the tag 218 and send that information to the integrated location server 204 via the communication network 226. The WiFi access point 220 may also receive an RF signal in the WiFi format sent by the tag 218. The WiFi access point 220 may then detect information relating to the location of the tag 218 and wirelessly send the information to the integrated location server 204 via the RF gateways 208 and 209 and the communication network 226.

The integrated location tag 214 may be in a location served by the WiFi access point 220 and the UWB receiver 222. The UWB receiver 222 may receive an RF signal in the UWB format sent by the tag 214. The UWB receiver 222 may then detect information relating to the location of the tag 214 and send that information to the integrated location server 204 via the communication link 224 to the WiFi access point 220, which wirelessly sends the information to the integrated location server 204 via the RF gateways 208 and 209 and the communication network 226. The WiFi access point 220 may also receive an RF signal in the WiFi format sent by the tag 214. The WiFi access point 220 may then detect information relating to the location of the tag 214 and wirelessly send the information to the integrated location server 204 via the RF gateways 208 and 209 and the communication network 226.

Thus, the integrated location server 204 receives information relating to the locations of the integrated location tags 214, 216 and 218 from the UWB receivers 210 and 222 and the WiFi access points 212 and 220. The server 204 may then calculate the locations of the tags 214, 216 and 218 from any or all of the received information relating to the location of the tag.

Because the WiFi access point 220 is able to communicate with both the RF gateways 208 and 209, two wireless communications pathways are established between the WiFi access point 220 an the integrated location server 204. As a result, an interruption to one of the two communication paths may occur without preventing the integrated location server 204 from continuing to receive location information from the WiFi access point 220 and the UWB receiver 222.

Although FIG. 2 illustrates one example of a system for providing integrated wireless reporting of location information, various changes may be made to FIG. 2. For example, the layout and arrangement of the system could vary, and any number of tags, access points, location receivers, gateways, networks, servers, and control systems could be used or supported. While only integrated location tags are shown in the system 200, it will be understood that single format tags (such as those shown in the system 100) may also be used in the system 200.

In other embodiments of this disclosure, other technologies than WiFi may be used for bi directional wireless communication between process control systems and location detection receivers, actuators, sensors and other process control elements. Similarly, other technologies than WiFi and UWB, such as ZigBee, may be used for location detection.

Also, components could be combined or omitted and additional components could be added in the system 200 according to particular needs. Furthermore, while the wireless communication of system 200 is described as radio frequency communication, it will be understood that other types of wireless communication, such as infrared, may be used. In addition, while described as being used to providing wireless reporting of location information in an industrial facility, the system 200 could be used to provide wireless reporting of location information in any other type of environment.

Figure 3:
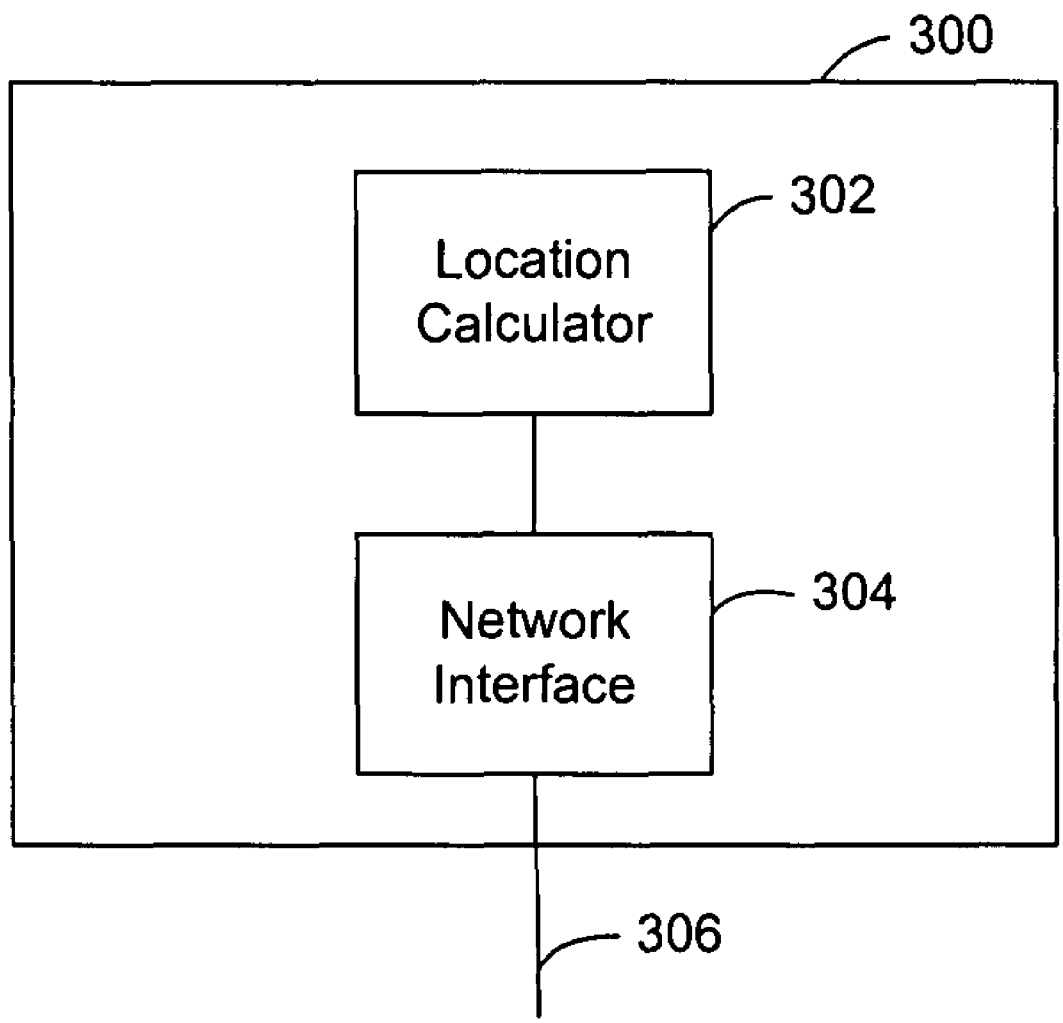
FIG. 3 illustrates an integrated location server according to the present disclosure.

FIG. 3 illustrates an integrated location server 300 according to the present disclosure. The embodiment of the device 300 shown in FIG. 3 is for illustration only. Other embodiments of the server 300 could be used without departing from the scope of this disclosure. Also, for ease of explanation, the server 300 is described with respect to the system 200 of FIG. 2. The node 300 could be used in any suitable system.

The integrated location server 300 includes a location calculator 302 and a network interface 304. The network interface 304 couples the location calculator 302 to a communication network 306, which may be the communication network 226 of FIG. 2.

As described with regard to FIG. 2, the integrated location server 300 may receive information via the communication network 306 relating to a location of a location detection tag from location detection receivers using a plurality RF formats. The location calculator 302 receives the information via the network interface 304 and may then calculate a location for the tag.

In some embodiments of this disclosure, the location calculator receives a message from the control system 202 indicating that information determined from RF signals in a first format ("first format information") is preferable over information determined from RF signals received in a second format ("second format information"). In response to such a message, when the location calculator 302 receives information determined from both formats, it calculates the location of the tag from the first format information determined. However, where the location calculator 302 only receives second format information, the location calculator 302 may calculate the location of the tag from the second format information. Once the location calculator 302 is again receiving first format information, it may resume calculating the location of the tag from the preferred first format information.

In other embodiments of this disclosure, a location detection tag transmits a unique identifier identifying the tag. The location calculator 302 may receive a message from the control system 202 indicating that the location of a specified tag is preferably to be calculated from first format information, identifying the tag by its unique identifier. In response to such a message, when the location calculator 302 receives both first format information and second format information, it calculates the location of the specified tag from the first format information. However, where the location calculator 302 only receives second format information, the location calculator 302 may calculate the location of the specified tag from the received second format information. Once the location calculator 302 is again receiving first format information, it may resume calculating the location of the specified tag from the preferred first format information.

Although FIG. 3 illustrates one example of an integrated tracking receiver and wireless relay node, various changes may be made to FIG. 3. For example, the layout and arrangement of the node 300 could vary, and any number of tracking receivers, wireless nodes, numbers and types of antennas could be used or supported. Also, components could be combined or omitted and additional components could be added in the node 300 according to particular needs.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a location detection (LD) transmitter configured to transmit a first radio frequency (RF) signal in a first protocol and a second RF signal in a second protocol;
   a first LD receiver configured to:
      receive the first RF signal from the LD transmitter; and
      determine from the first RF signal first information relating to a location of the LD transmitter;
   a second LD receiver configured to:
      receive the second RF signal from the LD transmitter; and
      determine from the second RF signal second information relating to the location of the LD transmitter; and
   an LD server configured to:
      receive the first information and the second information wirelessly from the first LD receiver and the second LD receiver, respectively;
      receive, from an industrial process control system, an identification of a preferred one of the first information and the second information; and
      calculate the location of the LD transmitter from the preferred one of the first information and the second information.

2. The system of claim 1, wherein:
   the first protocol is a WiFi protocol; and
   the second protocol is selected to improve an accuracy in calculating the location of the LD transmitter.

3. The system of claim 1, wherein the LD server is further configured to calculate the location of the LD transmitter from another one of the first information and the second information in response to a failure to receive the preferred one of the first information and the second information.

4. The system of claim 1, wherein:
   the LD transmitter is further configured to transmit an identifier in at least one of the first RF signal and the second RF signal; and
   the LD server is further configured to:
   receive the identifier from at least one of the first LD receiver and the second LD receiver; and
   in response to the identifier, calculate the location of the LD transmitter.

5. The system of claim 4, wherein the LD server is further configured to calculate the location of the LD transmitter from another one of the first information and the second information in response to a failure to receive the preferred one of the first information and the second information.

6. The system of claim 1, wherein the LD server is further configured to receive the first information and the second information wirelessly via a plurality of intermediate nodes.

7. The system of claim 1, wherein:
   the first protocol is a WiFi protocol; and
   the second protocol is an Ultra Wide Band protocol.

8. An apparatus comprising:
   a network interface; and
   a location calculator configured to:
      receive via the network interface first information from a first location detection (LD) receiver, the first information relating to a location of an LD transmitter and determined from a first radio frequency (RF) signal in a first protocol received from the LD transmitter;
      receive via the network interface second information from a second LD receiver, the second information relating to the location of the LD transmitter and determined from a second RF signal in a second protocol received from the LD transmitter;
      receive, from an industrial process control system, an identification of a preferred one of the first information and the second information for the LD transmitter; and
      calculate the location of the LD transmitter from the preferred one of the first information and the second information.

9. The apparatus of claim 8, wherein:
   the first protocol is a WiFi protocol; and
   the second protocol is selected to improve an accuracy in calculating the location of the LD transmitter.

10. The apparatus of claim 8, wherein the location calculator is further configured to calculate the location of the LD transmitter from another one of the first information and the second information in response to a failure to receive the preferred one of the first information and the second information.

11. The apparatus of claim 8, wherein the location calculator is further configured to:
    receive an identifier of the LD transmitter from at least one of the first LD receiver and the second LD receiver; and
    in response to the identifier, calculate the location of the LD transmitter.

12. The apparatus of claim 11, wherein the location calculator is further configured to calculate the location of the LD transmitter from another one of the first information and the second information in response to a failure to receive the preferred one of the first information and the second information.

13. The apparatus of claim 8, wherein:
    the first protocol is a WiFi protocol; and
    the second protocol is an Ultra Wide Band protocol.

14. A method comprising:
    transmitting a first radio frequency (RF) signal in a first protocol from a location detection (LD) transmitter;
    transmitting a second RF signal in a second protocol from the LD transmitter;
    receiving the first RF signal in a first LD receiver and determining from the first RF signal first information relating to a location of the LD transmitter;
    receiving the second RF signal in a second LD receiver and determining from the second RF signal second information relating to the location of the LD transmitter;
    receiving the first information and the second information in an LD server;
    receiving, from an industrial process control system, an identification of a preferred one of the first information and second information receive; and
    calculating the location of the LD transmitter at the LD server from the preferred one of the first information and the second information.

15. The method of claim 14, wherein:
the first protocol is a WiFi protocol; and
the second protocol is selected to improve an accuracy in calculating the location of the LD transmitter.

16. The method of claim 14, further comprising: calculating the location of the LD transmitter from another one of the first information and the second information in response to a failure to receive the preferred one of the first information and the second information.

17. The method of claim 14, further comprising:
transmitting an identifier in at least one of the first RF signal and the second RF signal;
receiving in the LD server the identifier from at least one of the first LD receiver and second LD receiver; and
in response to the identifier, calculating the location of the LD transmitter.

18. The method of claim 17, further comprising:
calculating the location of the LD transmitter from another one of the first information and the second information in response to a failure to receive the preferred one of the first information and the second information.

19. The method of claim 14, wherein receiving the first information and the second information wirelessly in the LD server further comprises receiving the first information and the second information via a plurality of intermediate nodes.

20. The method of claim 14, wherein:
the first protocol is a WiFi protocol; and
the second protocol is an Ultra Wide Band protocol.

* * * * *